US009787585B2

(12) United States Patent
Hieda

(10) Patent No.: US 9,787,585 B2
(45) Date of Patent: Oct. 10, 2017

(54) DISTRIBUTED STORAGE SYSTEM, CONTROL APPARATUS, CLIENT TERMINAL, LOAD BALANCING METHOD AND PROGRAM

(71) Applicant: NEC CORPORATION, Tokyo (JP)

(72) Inventor: Satoshi Hieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 37 days.

(21) Appl. No.: 14/388,654

(22) PCT Filed: Mar. 29, 2013

(86) PCT No.: PCT/JP2013/059567
§ 371 (c)(1),
(2) Date: Sep. 26, 2014

(87) PCT Pub. No.: WO2013/147175
PCT Pub. Date: Oct. 3, 2013

(65) Prior Publication Data
US 2015/0049764 A1     Feb. 19, 2015

(30) Foreign Application Priority Data
Mar. 30, 2012   (JP) .................................. 2012-079952

(51) Int. Cl.
*H04L 12/28*     (2006.01)
*H04L 12/56*     (2006.01)
(Continued)

(52) U.S. Cl.
CPC .............. *H04L 45/72* (2013.01); *H04L 45/44* (2013.01); *H04L 45/7453* (2013.01); *H04L 67/1023* (2013.01); *H04L 67/1097* (2013.01)

(58) Field of Classification Search
CPC ..... H04L 45/72; H04L 45/44; H04L 45/7453; H04L 67/1023; H04L 67/1097
See application file for complete search history.

(56) References Cited

U.S. PATENT DOCUMENTS 7,653,703 B2   1/2010   Toumura et al.
7,739,398 B1   6/2010   Shabtay
(Continued)

FOREIGN PATENT DOCUMENTS

CN        1354578 A       6/2002
JP    2003-131961 A       5/2003
(Continued)

OTHER PUBLICATIONS

Extended European Search Report dated Nov. 9, 2015.
(Continued)

*Primary Examiner* — Lonnie Sweet
(74) *Attorney, Agent, or Firm* — McGinn IP Law Group, PLLC

(57) ABSTRACT

A distributed storage system includes: a plurality of servers that store data that is associated with key information, respectively; a packet forwarding apparatus that, on receipt of a new packet that contains the key information and is addressed to one of the plurality of servers, requests a control apparatus to decide a forwarding destination from among the plurality of servers; and the control apparatus. The control apparatus includes: a forwarding destination selection section that decides a forwarding destination of the packet based on key information in a header part of the packet; and an entry setting section that sets, in a packet forwarding apparatus(es) on a path to the forwarding destination, a flow entry for forwarding a subsequent packet(s) with same key information to the forwarding destination. The packet forwarding apparatus(es) forwards a packet(s) with the same key information to the forwarding destination using the set flow entry.

14 Claims, 14 Drawing Sheets

(51) Int. Cl.
*H04L 12/721* (2013.01)
*H04L 12/743* (2013.01)
*H04L 29/08* (2006.01)

(56) References Cited

U.S. PATENT DOCUMENTS

| | | | |
|---|---|---|---|
| 8,130,747 B2 | 3/2012 | Li et al. | |
| 9,185,056 B2* | 11/2015 | Adams | H04L 41/0893 |
| 2006/0248195 A1 | 11/2006 | Toumura et al. | |
| 2007/0157262 A1* | 7/2007 | Ramaswamy | H04H 20/14 725/87 |
| 2009/0310485 A1* | 12/2009 | Averi | H04L 45/00 370/232 |
| 2011/0026403 A1* | 2/2011 | Shao | H04L 67/2895 370/235 |
| 2011/0040892 A1 | 2/2011 | Amemiya et al. | |
| 2011/0231615 A1* | 9/2011 | Ober | G06F 12/0868 711/142 |
| 2011/0307533 A1 | 12/2011 | Saeki | |

FOREIGN PATENT DOCUMENTS

| | | |
|---|---|---|
| JP | 2006-309383 A | 11/2006 |
| JP | 2011-41006 A | 2/2011 |
| JP | 2011-53932 A | 3/2011 |
| JP | 2011-258016 A | 12/2011 |

OTHER PUBLICATIONS

International Search Report (ISR) (PCT Form PCT/ISA/210), in PCT/JP2013/059567, dated Jun. 18, 2013.

Nick McKeown and seven others: "OpenFlow: Enabling Innovation in Campus Networks," [online], [searched on Feb. 14, 2012], Internet <URL: http://www.openflow.org/documents/openflow-wp-latest.pdf>.

"OpenFlow Switch Specification, Version 1.1.0, Implemented (Wire Protocol 0x02)," [online], [searched on Feb. 14, 2012], Internet <URL: http://www.openflow.org/documents/openflow-spec-v1.1.0.pdf>.

Walter Robert J. Harrison, "Frenetic: A Network Programming Language", Master's thesis, Princeton University, May 2011, pp. 34-37, 56-61, [retrieved on Jun. 7, 2013]. Retrieved from the Internet: <URL: http://frenetic-lang.org/publications/harrison-mse-thesis.pdf>.

DeCandia, G. et al., "Dynamo: amazon's highly available key-value store", in ACM Symposium on Operating Systems Principles: Proceedings of Twenty-First ACM SIGOPS Symposium on Operating systems principles, vol. 14, No. 17, 2007, pp. 205-220.

Chinese Office Action dated Jul. 4, 2016, with an English translation.

* cited by examiner

FIG. 3

| CATEGORY ID | SERVER INFORMATION |
|---|---|
| 0 | $S_0$ |
| 1 | $S_1$ |
| 2 | $S_2$ |
| 3 | $S_3$ |

FIG. 8

| CATEGORY ID | SERVER INFORMATION |
|---|---|
| 0 | $S_0, S_1, S_2$ |
| 1 | $S_3, S_4, S_5$ |
| 2 | $S_6, S_7, S_8$ |
| 3 | $S_9, S_{10}, S_{11}$ |

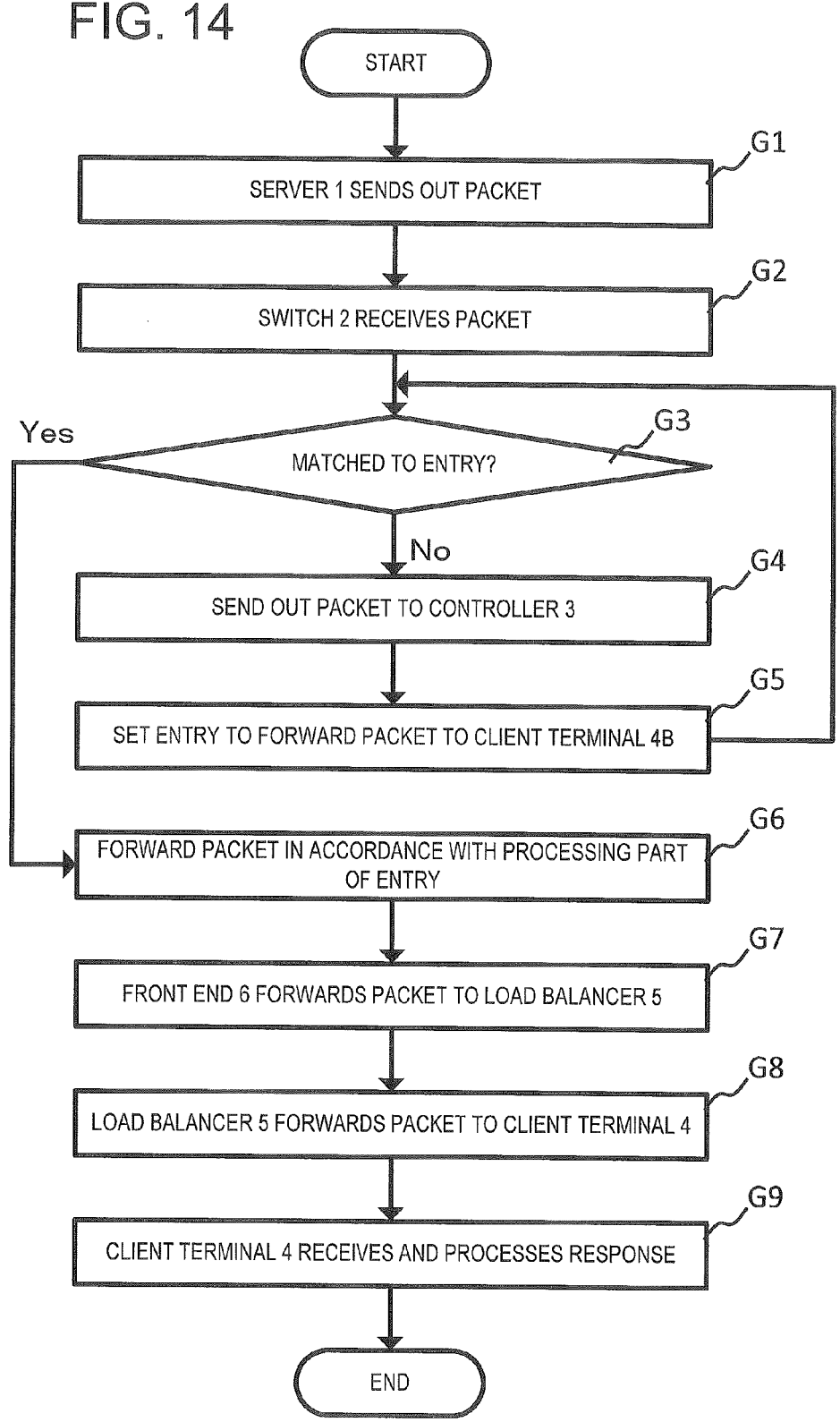

DISTRIBUTED STORAGE SYSTEM, CONTROL APPARATUS, CLIENT TERMINAL, LOAD BALANCING METHOD AND PROGRAM

TECHNICAL FIELD

Description of Related Application

The present application claims priority from Japanese Patent Application No. 2012-079952 (filed on Mar. 30, 2012), the content of which is hereby incorporated in its entirety by reference into this disclosure.

The present invention relates to a distributed storage system, a control apparatus, a client terminal, a load balancing method and a program and, more particularly, to a distributed storage system, a control apparatus, a client terminal, a load balancing method and a program, in which key-value type data are supervised.

BACKGROUND

In Patent Literature 1, there is disclosed a network system in which the load imposed on a Web server(s) within a site is alleviated by a load balancer to enable high-speed path switching even on occurrence of failures on a path getting to the load balancer. According to Patent Literature 1, when a router disposed halfway between a client terminal and a server has received a packet from the client terminal, the router decides on a forwarding destination server based on a destination L4 port number as well as a hash value of a source address contained in a packet header. By so doing, it is possible to allocate processing to servers that differ from one service recognizable on the layer 4 (L4) to another.

In Patent Literature 2, there is disclosed a load balancer which will prevent deterioration of a response characteristic to the client terminal as uniqueness is positively maintained. In this Patent Literature, a relay apparatus(es) arranged between the load balancer and the server references a response from the server to the client terminal to post-write or add a path identifier (an identifier allocated from one relay apparatus to another) in L7 data. When the client terminal re-sends the request, the path identifier, received last time, is embedded in the request. The load balancer that has received the packet transfers it to an appropriate one of the relay apparatuses.

In Patent Literature 3, there is disclosed a computer system in which the processing of deciding a forwarding destination is divisionally taken charge of by a plurality of apparatuses so as to reduce the storage capacity or the amount of calculations of a URL (Uniform Resource Locator) switch.

In Non-Patent Literatures 1 and 2, there is disclosed a centralized control type network called an OpenFlow exploiting a centralized control configuration network architecture in which a control apparatus termed an OpenFlow controller controls the behavior of a switch termed an OpenFlow switch. The behavior of a number of these switches, making up a virtual network, can be flexibly modified in keeping with the status of the entire network. Thus, with the use of the OpenFlow, a highly flexible virtual network can be constructed with much ease.

Patent Literature 1:
JP Patent Kokai Publication No. JP2003-131961A
Patent Literature 2:
JP Patent Kokai Publication No. JP2011-041006A
Patent Literature 3:
JP Patent Kokai Publication No. JP2006-309383A
Non-Patent Literature 1:
Nick McKeown and seven others: "OpenFlow: Enabling Innovation in Campus Networks," [online], [searched on Feb. 14, 2012], Internet <URL: http://www.openflow.org/documents/openflow-wp-latest.pdf>.
Non-Patent Literature 2:
"OpenFlow Switch Specification, Version 1.1.0, Implemented (Wire Protocol 0x02)," [online], [searched on Feb. 14, 2012], Internet <URL: http://www.openflow.org/documents/openflow-spec-v1.1.0.pdf>.

SUMMARY

The following analysis is given by the present invention. In a distributed storage system that supervises key-value configuration data, it is difficult to accomplish selecting the forwarding destination server by a single selection apparatus and decreasing delay in request processing in combination. Selecting the forwarding destination server by a single selection device means carrying out the processing of selecting, at a single node, to which servers the total of the requests from the client terminal is to be transferred. If such processing is carried out by a plurality of nodes, and a server(s) is added or removed, it is necessary to use a proper scheme to maintain the uniqueness of the server information from one node to another, thus complicating the processing.

On the other hand, if the selection of the forwarding destination server is made by a single node, it becomes necessary for the single selecting node to receive the total of the requests from the total of the client terminals and to select the forwarding destination server to perform the forwarding processing. This may lead to an increased load on the single node to aggravate the delay in request processing.

In the network system of Patent Literature 1, if the requests from a specified client terminal to the same service are made frequently, the requests are forwarded to the same server, so that load balancing may not be sufficient.

In Patent Literature 2, it is again necessary for the relay apparatus to reference the total of the responses from the server to the client terminal, thus possibly increasing the processing delay.

In Patent Literature 3, the forwarding destination is decided using a forwarding destination selection table that coordinates the hash value of a fixed length, calculated from the identifier of contents requested from the client terminal, with the forwarding destination. If the requests are concentrated on specified contents, the same server is necessarily selected, so that load balancing may similarly not be maintained.

Therefore, there is a need in the art to accomplish selection of the forwarding destination servers by a single selection apparatus and reduction in the delay in the request processing in combination.

According to a first aspect of the present invention, there is provided a distributed storage system. The distributed storage system comprises: a plurality of servers that store data that is associated with key information, respectively; a packet forwarding apparatus that, on receipt of a new packet that contains the key information and is addressed to one of the plurality of servers, requests a control apparatus to decide a forwarding destination from among the plurality of servers; and the control apparatus. The control apparatus comprises: a forwarding destination selection section that decides a forwarding destination of the packet based on key information in a header part of the packet; and an entry setting section that sets, in a packet forwarding apparatus(es) on a path to the forwarding destination, a flow entry for forwarding a subsequent packet(s) with same key information to the forwarding destination. The packet forwarding apparatus(es) forwards a packet(s) with the same key information to the forwarding destination using the set flow entry.

According to a second aspect of the present invention, there is provided a control apparatus connected to a plurality of servers and a packet forwarding apparatus. The plurality of servers stores data that is associated with key information, respectively. The packet forwarding apparatus requests the control apparatus to decide a forwarding destination from among the plurality of servers on receipt of a new packet that contains the key information and is addressed to one of the plurality of servers. The control apparatus comprises: a forwarding destination selection section that decides a forwarding destination of the packet based on key information in a header part of the packet; and an entry setting section that sets, in a packet forwarding apparatus(es) on a path to the forwarding destination, a flow entry for forwarding a subsequent packet(s) with same key information to the forwarding destination.

According to a third aspect of the present invention, there is provided a client terminal. The client terminal comprises an address setting section that generates a request packet with a destination address generated using a hashed value of key information. The client terminal requests a server using the request packet.

According to a fourth aspect of the present invention, there is provided a load balancing method. The load balancing method comprises: by a control apparatus, receiving from a packet forwarding apparatus a request for deciding a forwarding destination of a new packet with key information paired to a value(s); deciding a forwarding destination of the packet from among a plurality of servers based on the key information in a header part of the packet; and setting, in a packet forwarding apparatus(es) on a path to the forwarding destination, a flow entry for forwarding a subsequent packet(s) with same key information to the forwarding destination. The present invention is bound up with a specified machine which is a computer that presents items to a user and that accepts selection of the items from the user.

According to a fifth aspect of the present invention, there is provided a program for a computer loaded on a control apparatus that is connected to a plurality of servers and a packet forwarding apparatus. The plurality of servers storing data that is associated with key information, respectively. The packet forwarding apparatus requests the control apparatus to decide a forwarding destination from among the plurality of the servers on receipt of a new packet that contains the key information and is addressed to one of the plurality of servers. The program causes the computer to execute: deciding a forwarding destination of the packet from among a plurality of servers based on the key information in a header part of the packet; and setting, in a packet forwarding apparatus(es) on a path to the forwarding destination, a flow entry for forwarding a subsequent packet(s) with same key information to the forwarding destination. It is noted that the program can be recoded on a computer-readable, that is, non-transient, recording medium. That is, the present invention may be implemented as a computer program product.

The present invention provides the following advantage, but not restricted thereto. According to the present invention, it is possible, in a distributed storage system supervising key-value type data, to contribute to accomplishing selection of a forwarding destination server by a single selection node and reduction of the delay in request processing at the same time.

BRIEF DESCRIPTION OF THE DRAWINGS

FIG. 3 shows an example of a server table retained by a control apparatus according to the first exemplary embodiment of the present invention.

FIG. 8 shows an example of a server table retained by a control apparatus of the second exemplary embodiment of the present invention.

FIG. 14 is a flowchart for illustrating an operation (at the time of a response from the server) of the third exemplary embodiment of the present invention.

Figure 1:
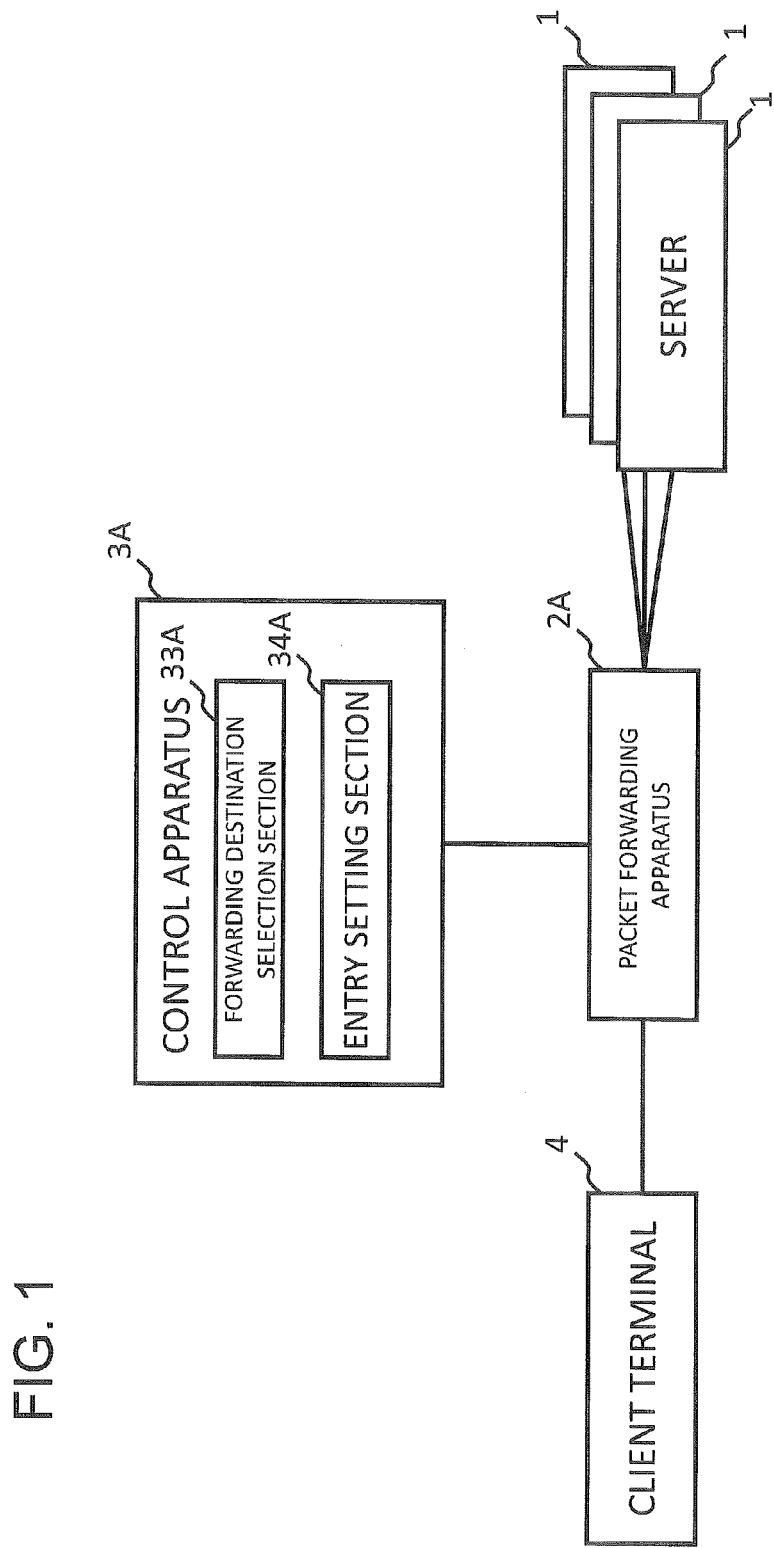
FIG. 1 is a block diagram showing a configuration of an exemplary embodiment of the present invention.

In the present disclosure, there are various possible modes, which include the following, but not restricted thereto. Initially, a summary of an exemplary embodiment of the present invention will be described with reference to the drawings. It is noted that the symbols used in the summary for referring to the drawings are merely for assisting in understanding and are not intended to restrict the present invention to the modes illustrated.

With reference to FIG. 1, the present invention according to an exemplary embodiment may be implemented by a configuration comprising: a plurality of servers 1 that store data that is associated with key information, respectively; a packet forwarding apparatus 2A that, on receipt of a new packet that contains the key information and is addressed to one of the plurality of servers, requests a control apparatus 3A to decide a forwarding destination from among the plurality of servers, and the control apparatus 3A.

More specifically, the control apparatus 3A comprises: a forwarding destination selection section 33A that decides a forwarding destination of the packet based on key information in the packet; and an entry setting section 34A that sets, in a packet forwarding apparatus(es) 2A on a path to the forwarding destination, a flow entry for forwarding a subsequent packet(s) with same key information to the forwarding destination. The packet forwarding apparatus(es) 2A forwards a packet(s) with the same key information to the forwarding destination using the set flow entry.

As described above, it is possible to select the forwarding destination server by a single selection node (the above mentioned control apparatus 3A) and to decrease the delay in request processing (realized by the above flow entry) in combination.

First Exemplary Embodiment

Figure 2:
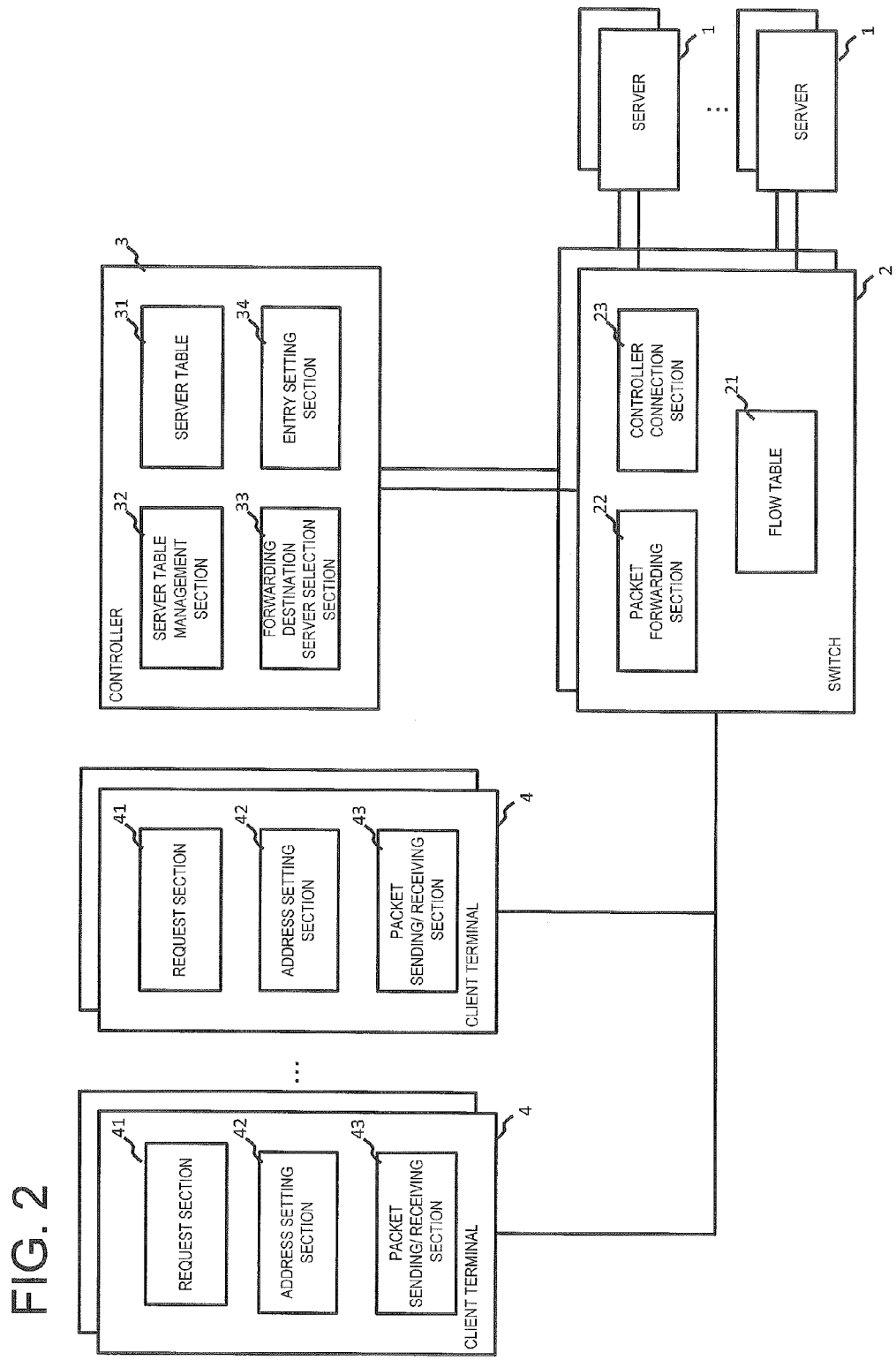
FIG. 2 is a block diagram showing a configuration of a distributed storage system according to a first exemplary embodiment of the present invention.

A first exemplary embodiment according to the present invention will now be detailed with reference to the drawings. FIG. 2 depicts a block diagram showing a configuration including a distributed storage system according to the first exemplary embodiment of the present invention. Referring to FIG. 2, there is shown a configuration including a server 1 that stores data, a switch 2 that forwards a packet (equivalent to the above mentioned packet forwarding apparatus), a controller 3 that controls the switch 2 and a client terminal 4 that sends out a request to the server. It is noted that, in actuality, one or more servers and one or more client terminals 4 are connected to the switch 2 and one or more switches 2 are connected to the controller 3.

The switch 2 includes a flow table 21, a packet forwarding section 22 and a controller connection section 23.

The flow table 21 is comprised of entries stating packet forwarding rules. Each entry is made up of a rule part that stores match conditions, and a processing part that stores processing contents applied to a packet that matches the match conditions. In the rule section, there may be stated, as match conditions, a switch port number received, a destination address, a source address, a V-LAN-ID, an L4 source port number, an L4 destination port number or otherwise. In the processing part, the forwarding switch port number, multicast and so forth may be stated.

The packet forwarding section 22 searches, from the flow table 21, an entry having match conditions matching the packet received, forwards a packet, or otherwise. Specifically, the packet forwarding section 22 collates a header part of the packet against the rule part of each entry and, in case of match, executes processing contents stored in the processing part. The flow table search as well as execution of the processing by the flow table 21 and the packet forwarding section 22 may be performed at high speed by using a configuration employing an ASIC (Application Specific Integration Circuit). In case the packet matched none of the entries, the packet forwarding section 22 sends out the packet to the controller 3 via the controller connection section 23 with a request for setting an entry. In short, the packet may be forwarded at a higher speed in case match occurred than in case no match occurred.

The controller connection section 23 forwards the packet, out of the received packets, that matches none of the entries, to the controller 3.

The controller 3 includes a server table 31, a server table management section 32, a forwarding destination server selection section 33 and an entry setting section 34.

The server table management section 32 manages the server table 31 that supervises the correspondence between the categories and servers in charge of the categories. In each of the categories in the server table 31, there is registered the information concerning the server(s) 1 in charge of the category. Examples of the server information include addresses of the servers and the port numbers of the switch 2 the servers are connected to. In each category, there is registered the information on at least one server. FIG. 3 shows an example server table.

On receipt of a packet from the switch 2, the forwarding destination server selection section 33 selects a forwarding destination server based on the packet received and the server table 31. In the subject exemplary embodiment, an upper order bit(s) of the forwarding destination address of the packet is mapped against the category IDs in the server table 31 to select the server 1 registered in the relevant category ID as the forwarding destination server.

The entry setting section 34 generates an entry for the flow table 21 so that the packet received will be forwarded to the server 1 selected by the forwarding destination server selection section 33. The entry setting section sets the so generated entry in the switch 2. Also, when the server 1 sends out a response of the results of processing to the client terminal 4, the entry setting section generates an entry for the flow table 21 so that the packet will be forwarded to the client terminal 4, and sets the so generated entry in the switch 2.

It is noted that the entry setting section 34 is able to distinguish a request packet from the client terminal 4 to the server 1 and a response packet from the server 1 to the client terminal 4 from each other. That is, when the source address of the packet, received from the switch 2, coincides with one of the addresses of the servers 1, managed by the server table 31, the packet received can be decided to be a response packet from the server 1 to the client terminal 4. If the source address coincides with none of the addresses managed by the server table 31, the packet received can be decided to be a request packet from the client terminal 4 to the server 1.

The switch 2 as well as the controller 3, described above, may be implemented by an OpenFlow switch disclosed in Non-Patent Literature 1 and an OpenFlow controller, disclosed in Non-Patent Literature 2, as respective basic configurations.

The client terminal 4 may be any one of various terminals each including a request section 41, an address setting section 42 and a packet sending/receiving section 43.

The request section 41 generates a request packet, such as a key-value type data write/readout request for the server 1.

The address setting section 42 sets a destination address and a source address of the request packet. As the destination address, a dummy address, consistent with the key information contained in the request or with the sort of the request, is set. Here, the key contained in the request is input as a letter string into a preset hash function, and a hash value of a preset number of bits, such as 32 bits, is calculated. The hash value, thus calculated, is used as the dummy address. As the source address, a correct address of the client terminal 4 is set.

The packet sending/receiving section 43 sends out a request packet from the request section 41 to the switch 2, while notifying the request section 41 about the response packet received from the switch 2.

The respective sections (processing means) of the switch 2, controller 3 and the client terminal 4, shown in FIG. 2, may be implemented by a computer program that causes a computer, making up these apparatuses, to execute the above mentioned respective processing operations using the computer's hardware.

An operation of the present exemplary embodiment will now be explained in detail with reference to the drawings. In the following explanation, it is assumed that a request to write data of (key1, value1) from the client terminal 4 is to be forwarded to an optimum one of four servers 1, where the request is then processed. It is also assumed that the controller 3 has already detected the four servers 1 and that its server table management section 32 has formed a server table such as one shown in FIG. 3.

Figure 4:
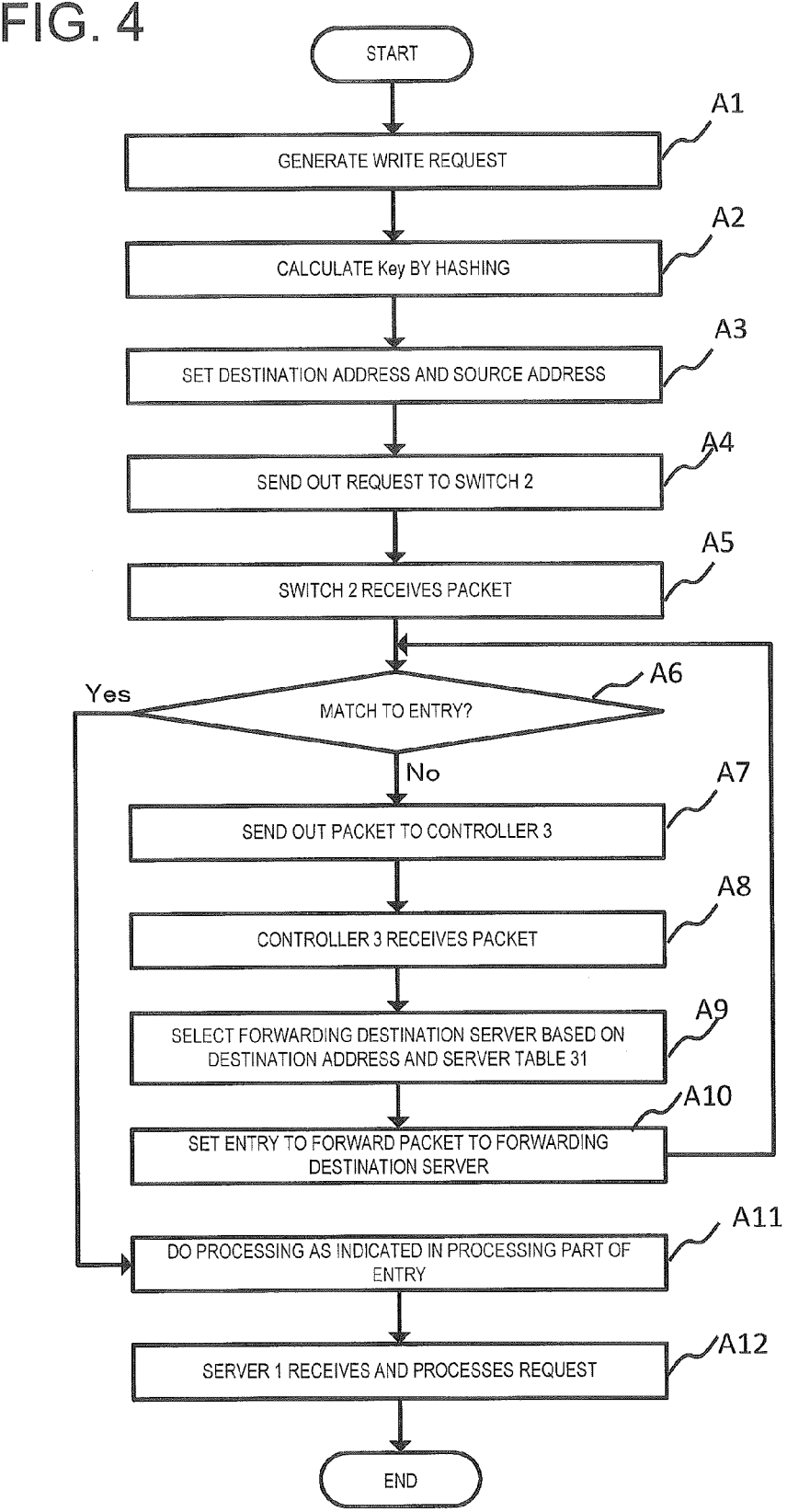
FIG. 4 is a flowchart for illustrating an operation (at the time of a write request) of the first exemplary embodiment of the present invention.

Initially, the operation of sending out the write request from the client terminal 4 to the server 1 is explained. FIG. 4 depicts a flowchart for illustrating an operation (at the time of a write request) of the first exemplary embodiment of the present invention.

Referring to FIG. 4, the request section 41 of the client terminal 4 generates a (key1, value1) write request (step A1). The address setting section 42 calculates a hash value of a preset number of bits, such as 32 bits, as the address setting section regards the key1 as a letter string (step A2). It is now assumed that the upper two bits of the hash value calculated are '10'. The address setting section sets above hash value as the packet's destination address, while setting a correct address of the client terminal as the source address (step A3). The packet sending/receiving section 43 then sends out the request to the switch 2 (step A4).

When the switch 2 has received the packet (step A5), the packet forwarding section 22 references the flow table 21 to confirm if there exists an entry that matches a received packet (step A6). If no entry is found (No of the step A6), the controller connection section 23 sends out the above mentioned packet to the controller 3 (step A7).

When the controller 3 has received the packet (step A8), the forwarding destination server selection section 33 selects the forwarding destination server based on the forwarding destination address of the received packet and the server table 31 (step A9). Specifically, the forwarding destination server selection section 33 selects, from the server table 31, the forwarding destination server to which the category ID corresponding to the upper bits of the destination address has been assigned. Since here the upper two bits of the hash value are '10' (=2), the forwarding destination server selection section 33 selects the server S2 of the category ID=2 as the forwarding destination server.

The entry setting section 34 then generates an entry, so that the packet will be forwarded to the forwarding destination server selected by the forwarding destination server selection section 33, and sets the so generated entry on the switch 2 on the path between the client terminal 4 and the selected server 1 (step A10). For instance, if the server S2 has been selected, the entry setting section generates an entry in which the flow entry condition part is the "destination address: upper two bits being '10,'" and the processing part is "the forwarding destination switch port number: P2," where P2 is the switch port number the server S2 is connected to. The entry setting section sets the so generated entry in the switch S2. The packet forwarding section 22 then again confirms if there is an entry that matches the packet (step A6). Since the entry has now been set in the step A10, the matched entry is found out this time.

It is noted that, if a matched entry has been found in the step A6 (Yes of the step A6), the switch 2 forwards the packet in accordance with the contents of its processing part (step S11). For instance, if the above mentioned entry has been set in the step A10, and the packet has matched the entry, the packet is sent from the port number P2 to the server S2. On receipt of the request, the server 1 performs processing consistent with the request (step A12).

If thenceforth the switch 2 has received the packet corresponding to "the source address: upper two bits being '10,'" the switch sends out the packet from its port number P2, without regard to the address of the source client terminal 4, without inquiring the controller 3 about the packet.

Figure 5:
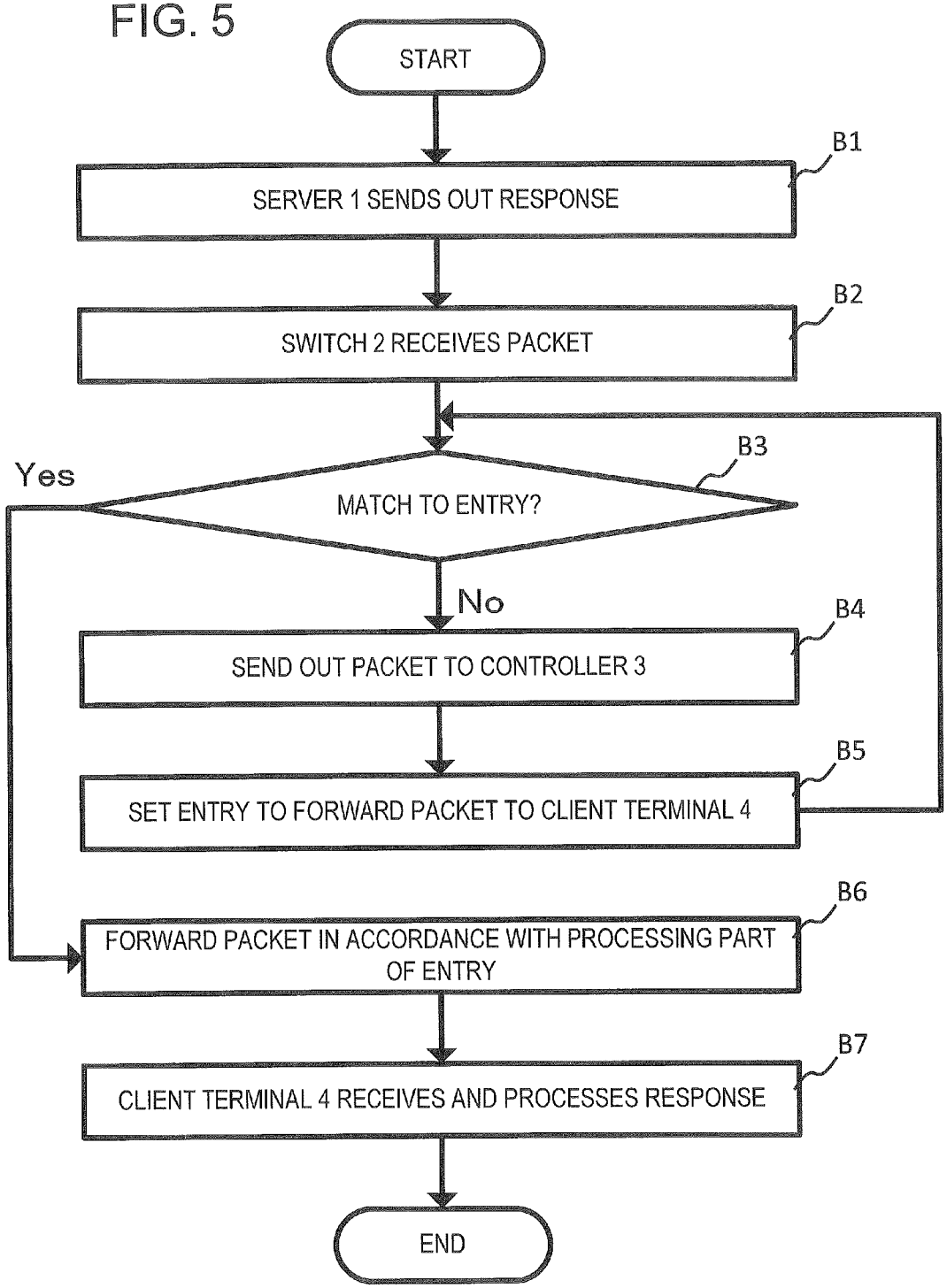
FIG. 5 is a flowchart for illustrating an operation (at the time of a response from the server) of the first exemplary embodiment of the present invention.

An operation of sending out a response from the server 1 that has received the request packet to the client terminal 4 will now be explained. FIG. 5 depicts a flowchart for illustrating an operation of the first exemplary embodiment of the present invention at the time of responding from the server.

Referring to FIG. 5, initially the server 1 sends out a response packet (step B1). When the switch 2 has received the packet (step B2), the packet forwarding section 22 references the flow table 21 to confirm if there exists an entry that matches the received packet (step B3). If no such entry is found (No of the step B3), the controller connection section 23 sends out the above mentioned response packet to the controller 3 (step B4).

The entry setting section 34 of the controller 3 generates an entry of the flow table 21 so that the packet will be forwarded to the client terminal 4, and sets the so generated entry on the switch 2 on the path between the server 1 and the destination client terminal 4 (step B5). The packet forwarding section 22 then again confirms if there is an entry that matches the packet (step B3).

If the matched entry has been found in the step B3 (Yes of the step B3), the switch 2 forwards the packet in accordance with the contents of the processing part of the entry (step B6). On receipt of a response, the client terminal 4 performs processing consistent with the response (step B7).

In the first exemplary embodiment of the present invention, described above, the packet that matches the entry set by the packet forwarding section 22 is forwarded at a high speed based on the flow table 21. On the other hand, the controller 3 is the sole selection node that selects the forwarding destination server. Therefore, the forwarding destination server is selected by a single selection node without compromising the reduction in the delay in the request processing.

In first the exemplary embodiment of the present invention, the entry setting section 34 generates an entry based not on the entire destination address, that is, on the hash value in its entirety, but on its upper bits. Hence, the probability of a hit on the entry of the flow table 21 at the time of forwarding a packet becomes high, thereby further reducing the delay in the packet forwarding.

Furthermore, in the first exemplary embodiment of the present invention, the address setting section 42 sets a dummy address as the destination address, while it is unnecessary to set the real address of the server 1. Hence, in adding a new client terminal 4, it is unnecessary to set the server information at the time of setup, so that the new client terminal may be introduced more readily.

Second Exemplary Embodiment

Figure 6:
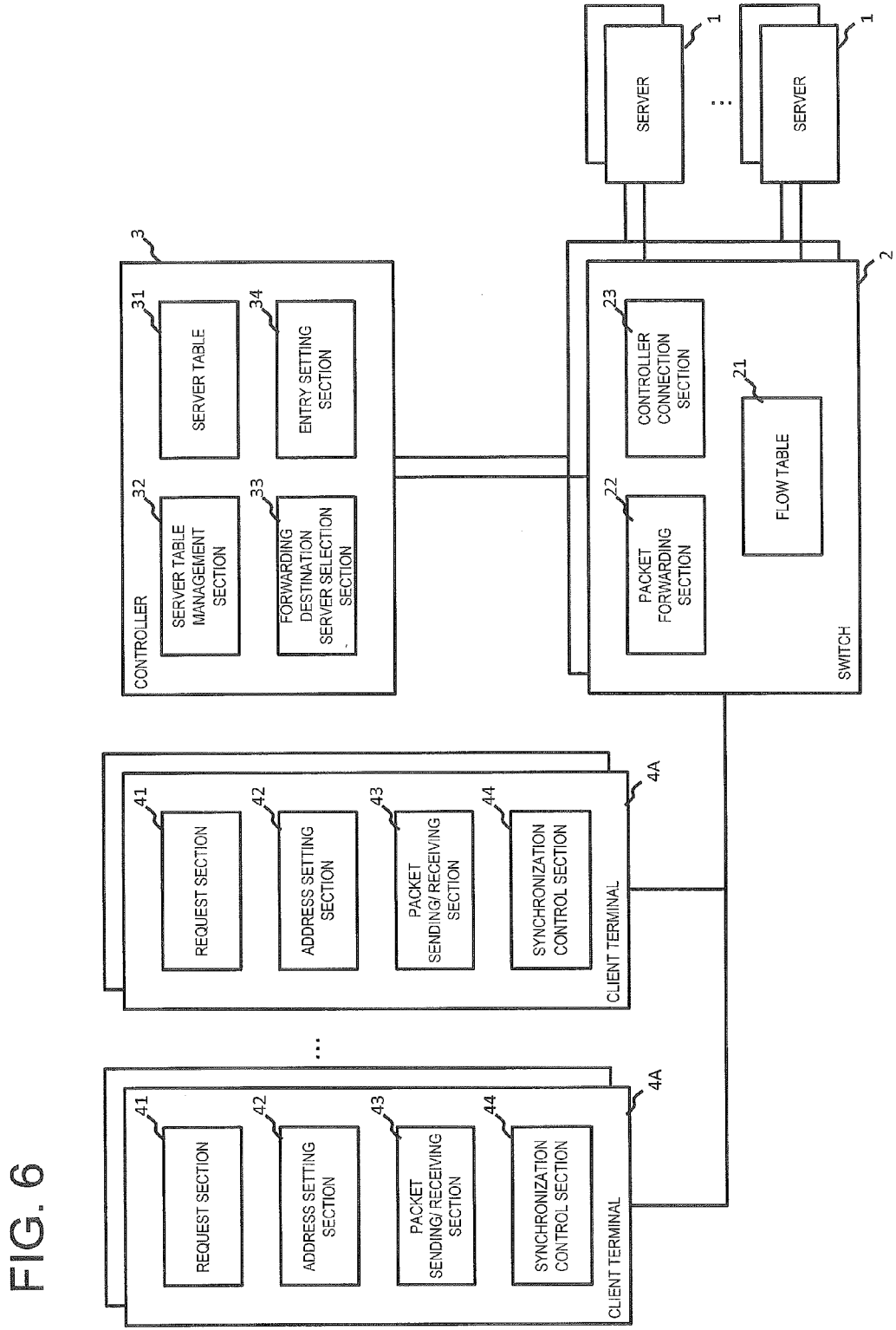
FIG. 6 is a block diagram showing a configuration of a distributed storage system according to a second exemplary embodiment of the present invention.

A second exemplary embodiment of the present invention, in which replication is made at the write time, will now be detailed with reference to the drawings. FIG. 6 depicts a configuration of a distributed storage system of the second exemplary embodiment of the present invention.

Referring to FIG. 6, there is shown a configuration which, as in the first exemplary embodiment of the present invention, includes a server 1, a switch 2, a controller 3 and a client terminal 4A. It is noted that the client terminal 4A differs from the corresponding component of the first exemplary embodiment of the present invention in further including a synchronization control section 44.

When the request section 41 sends out a write request, the synchronization control section 44 post-writes a request ID in the write request. When the packet sending/receiving section 43 receives a response to the write request, the synchronization control section references the request ID contained in the response. The synchronization control section supervises the number of the responses, so far returned, from one request ID to another. The synchronization control section returns the response to the request section 41 only when the number of the responses so far returned has reached a preset number of replications. In returning the response, if even one or more of an error(s) is contained in the response, the synchronization control section returns the response corrupted with an error(s). In there is no error, the synchronization control section returns the normal response. The synchronization control section 44 performs no operations when the request section 41 sends out a readout request or has received a response to its readout request.

The address setting section 42 sets a destination address and a source address of the request packet. As the destination address, a dummy address consistent with the key information contained in the request or with the request species is set. The present exemplary embodiment is similar to the exemplary embodiment as long as the points just stated are concerned. However, in the present exemplary embodiment, a hashed value of a pre-set number of bits, such as 32 bits, is calculated from the key contained in the request, and the lower most bit of the hashed value is overwritten by the request species, which is 1 for a write request and 0 for a readout request, to yield a dummy address.

Figure 7:
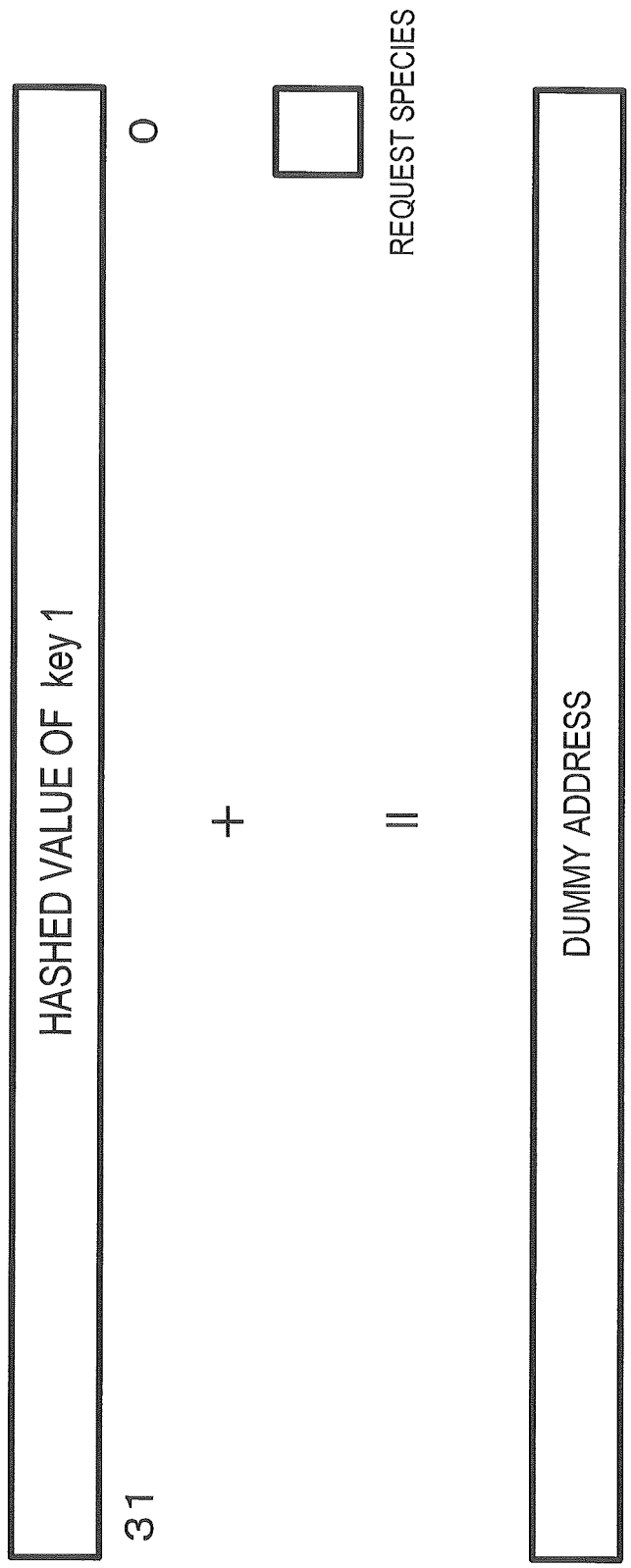
FIG. 7 is a schematic view for illustrating a method for generating a dummy address according to the second exemplary embodiment of the present invention.

FIG. 7 illustrates a method for generating a dummy address in the second exemplary embodiment of the present invention. The present exemplary embodiment is similar to the first exemplary embodiment in using the hashed value of the key1, however, the trailing bit of the hashed value is overwritten with the request species to yield the dummy address.

On receipt of the packet from the switch 2, the forwarding destination server selection section 33 of the controller 3 selects a forwarding destination server based on the received packet and the server table 31. Specifically, as in the first exemplary embodiment of the present invention, a server assigned to the category ID corresponding to the upper bits of the packet's destination address is selected from the server table 31. In addition, in the subject exemplary embodiment, if the request species of the lower most bit is 1 representing a write request, the forwarding destination server selection section 33 selects a number of forwarding destination servers equal to the preset number of times of replications. If the request species of the lower most bit is 0 representing a readout request, the forwarding destination server selection section selects a single forwarding destination server.

Otherwise, the configuration of the second exemplary embodiment of the present invention is similar to that of the above described first exemplary embodiment, and hence the description therefor is dispensed with.

An operation of the present exemplary embodiment will be explained in detail with reference to the drawings. In the following explanation, it is assumed that a write request for data (key1, value1) from the client terminal 4 is forwarded to an appropriate one 1 of 12 servers 1, where the request is then processed. It is also assumed that the number of times of replications of 3 has been set, and a server table shown in FIG. 8 has already been formulated by the server table management section 32.

Figure 9:
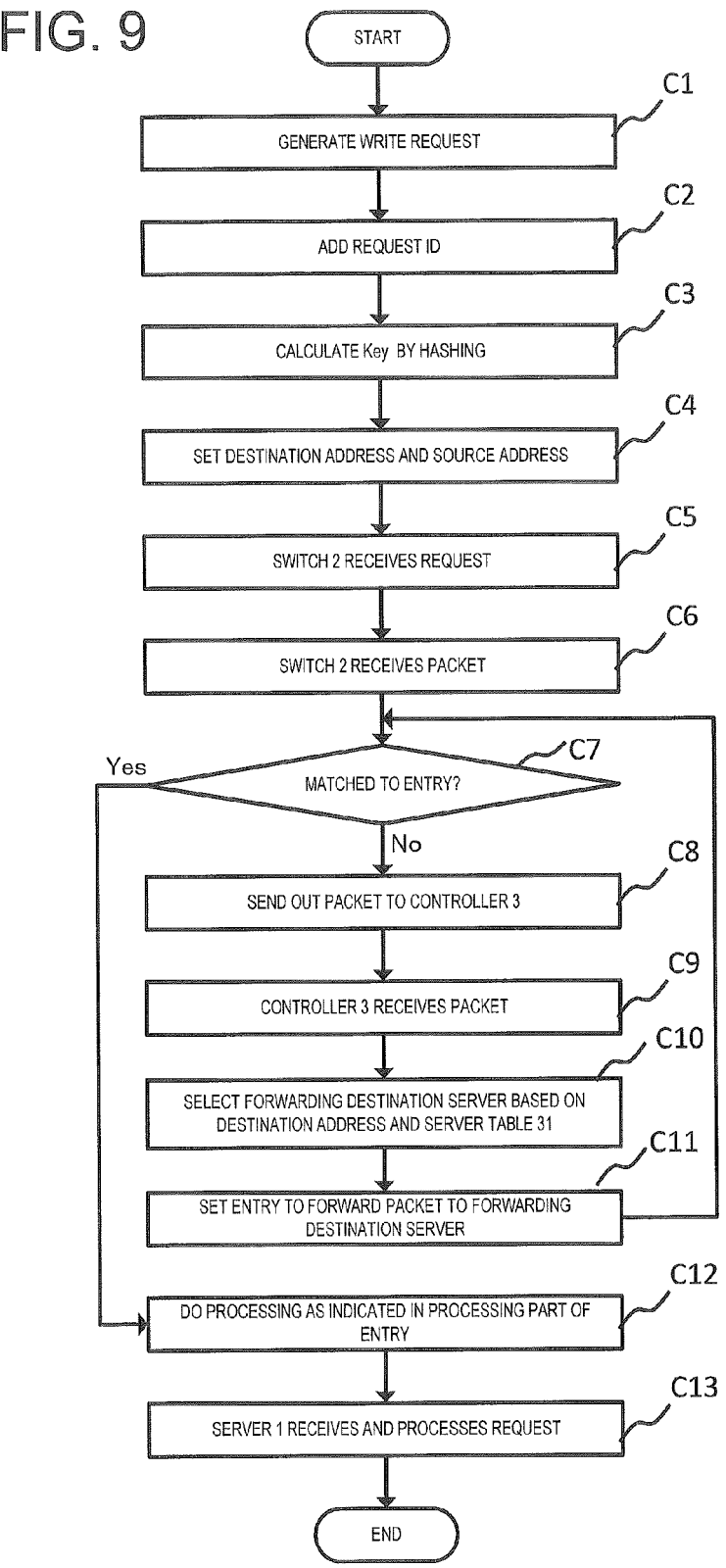
FIG. 9 is a flowchart for illustrating an operation (at the time of a write request) of the second exemplary embodiment of the present invention.

Initially, an operation of sending a write request from the client terminal 4 to the server 1 will be explained. FIG. 9 depicts a flowchart for illustrating an operation of the second exemplary embodiment of the present invention at the time of a write request.

Referring to FIG. 9, the request section 41 of the client terminal 4 generates a write request for (key1, value1) in a step C1. The synchronization control section 44 then post-writes a request ID in the write request (step C2). The address setting section 42 then calculates a hash value of a preset number of bits, for example 32 bits, as the address setting section regards the key1 as a letter string (step C3). It is here assumed that the upper two bits of the above mentioned hash value is '10'. The address setting section sets the above mentioned hash value and the request species (=1) as the packet's destination address (see FIG. 7), while setting the client terminal's correct address as the source address (step C4). The packet sending/receiving section 43 then sends out the request to the switch 2 (step C5).

On receipt of the packet (step C6), the switch 2 references the flow table 21 to check to see if there is an entry that matches the received packet (step C7). If no such entry is found (No of the step C7), the controller connection section 23 sends out the packet to the controller 3 (step C8).

When the packet is received by the controller 3 (step C9), the forwarding destination server selection section 33 selects the forwarding destination server based on the forwarding destination address of the received packet and the server table 31 (step C10).

Figure 10:
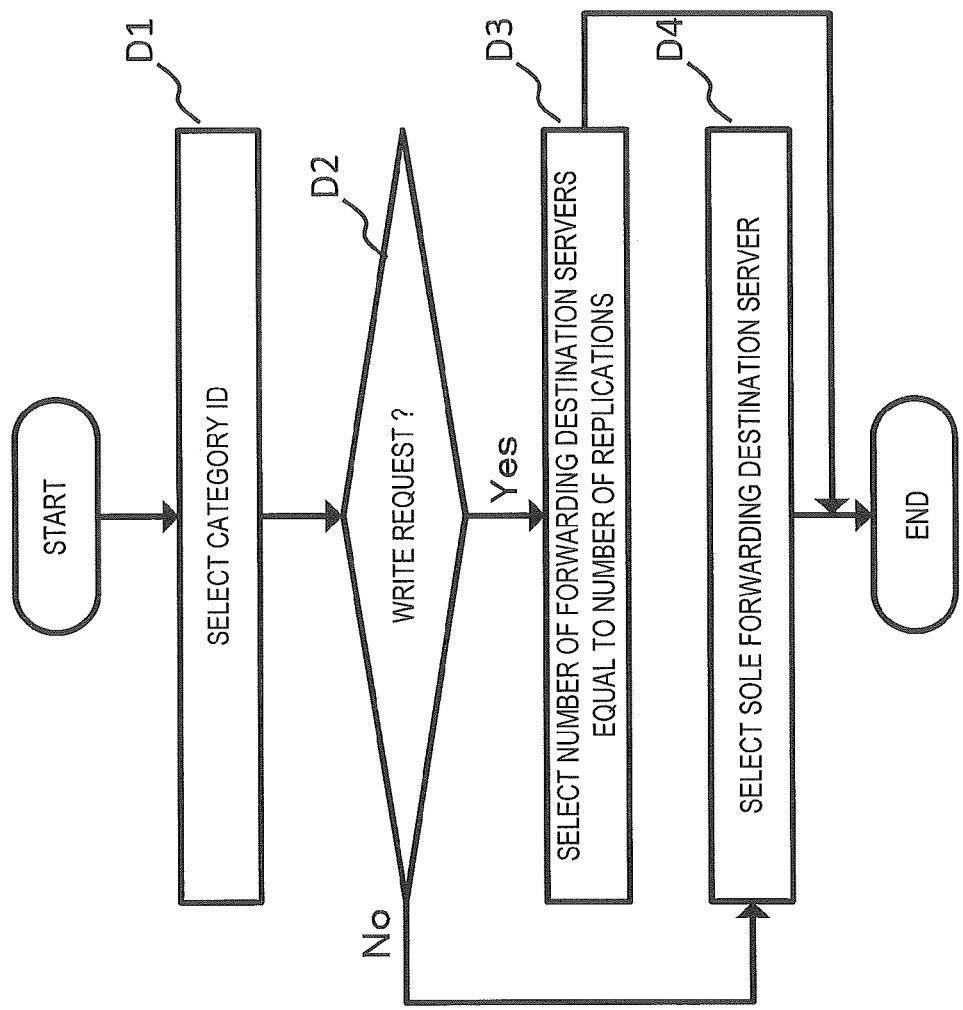
FIG. 10 is a flowchart for illustrating an operation (at the time of selection of the forwarding destination server) of the second exemplary embodiment of the present invention.

FIG. 10 depicts a flow table showing the detail of the above mentioned step C10. Referring to FIG. 10, the forwarding destination server selection section selects the category ID by mapping the upper bits of the forwarding destination address of the packet against the category IDs of the server table 31 (step D1 of FIG. 10). The forwarding destination server selection section then references the request species represented by the lower most bit (step D2). If the request species is 1 representing a write request (Yes of the step D2), a number of the forwarding destination servers equal to the preset number of times of the replications is selected (step D3). On the other hand, a sole forwarding destination server is selected in a step D4 if the request species is 0 representing a readout request (No of the step D2). For instance, if the upper two bits of the hash value are '10' (=2) and the lower most bit is '1,' the servers S6, S7 and S8, registered in the category ID2, are selected as the forwarding destination servers.

Referring again to FIG. 9, the entry setting section 34 generates an entry so that the packet will be forwarded to the forwarding destination server as selected by the forwarding destination server selection section 33, and sets the so generated entry in the switch 2 (step C11). For instance, if the servers selected are S6, S7 and S8, such an entry in which the conditional part is "forwarding destination address: upper two bits being '10,' the lower most bit being '1'" and the processing part is "forwarding destination switch port numbers: P6, P7, P8" (indicating switch port numbers connecting to the servers S6, S7, S8, respectively) is generated and set in the switch 2.

The packet forwarding section 22 then again confirms if there is an entry that matches the packet (step C7). Since the entry has now been set in the step C11, the matched entry is found out this time.

If the matched entry has been found in the step C7 (Yes in the step C7), the switch 2 forwards the packet in accordance with the contents of the processing part of the entry thus found (step C12). For instance, if the above mentioned entry has been set in the step C11 and the packet has matched the entry, the packet is sent by multi-cast from the port numbers P6, P7, P8 to the servers S6, S7, S8, respectively.

On receipt of the request, the servers 1 perform processing consistent with the request (step C13).

If thenceforth the switch 2 has received the packet corresponding to "the destination address: upper two bits being '10' and the lower most bit being '1,'" the switch sends out the packet from its ports P6, P7, P8, without regard to the address of the source client terminal 4, without inquiring the controller 3 about the packet.

Figure 11:
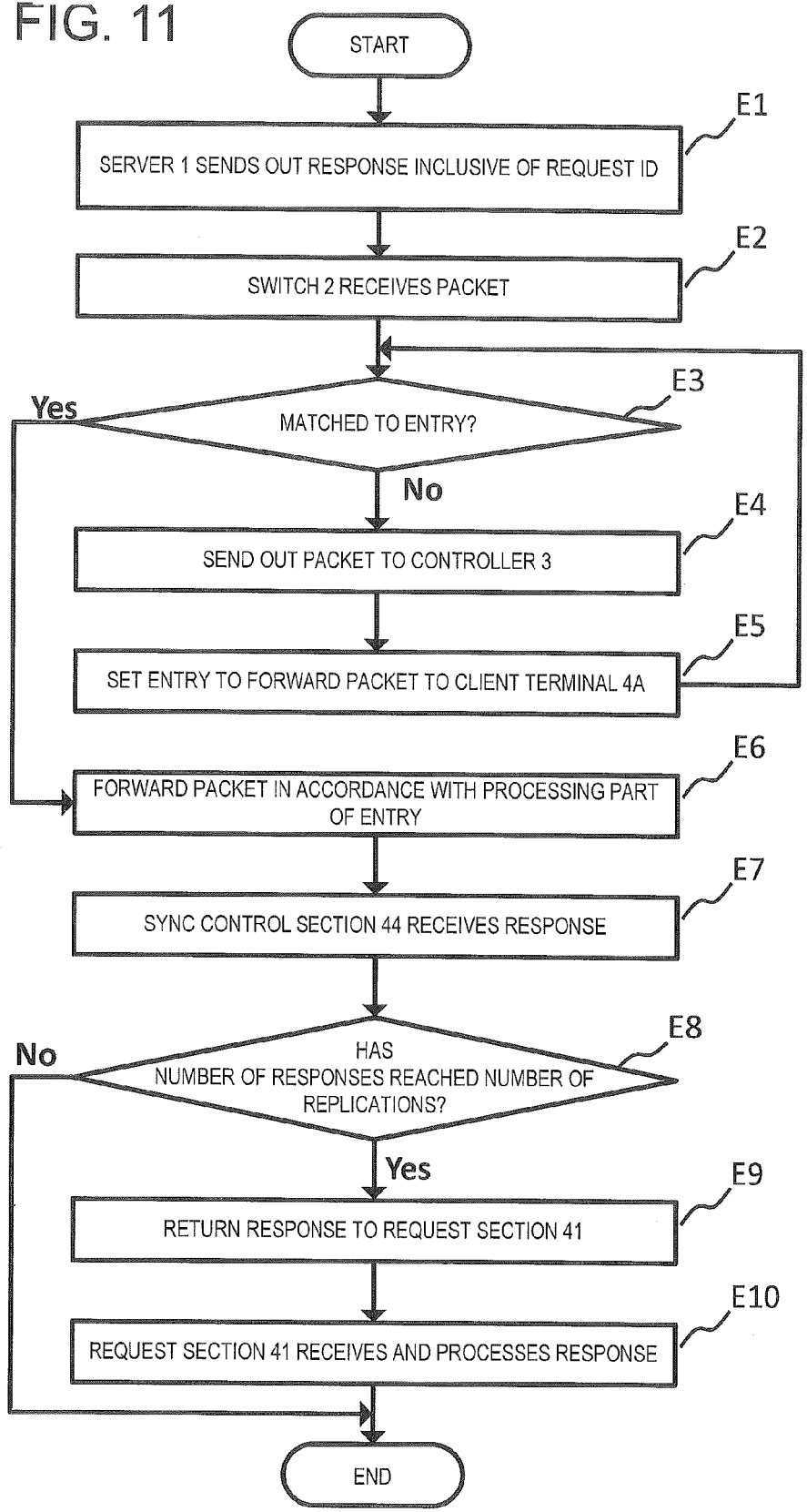
FIG. 11 is a flowchart for illustrating an operation (at the time of a response from the server) of the second exemplary embodiment of the present invention.

An operation of sending out a response from the server 1 that has received the request packet to the client terminal 4 will now be explained. FIG. 11 depicts a flowchart for illustrating an operation of the second exemplary embodiment of the present invention at the time of responding from the server.

Referring to FIG. 11, the server 1 initially sends out a response inclusive of the request ID contained in the request (step E1 of FIG. 11).

When the switch 2 has received a packet (step E2), the packet forwarding section 22 references the flow table 21 to check to see if there is any entry that matches the received packet (step E3). If no entry has been found (No of the step E3), the controller connection section 23 sends out the packet to the controller 3 (step E4).

The entry setting section 34 of the controller 3 generates an entry of the flow table 21 so that the packet will be forwarded to the client terminal 4, and sets the so generated entry in the switch 2 (step E5). The packet forwarding section 22 then again checks to see if there is any entry that matches the packet (step E3).

If the matched entry has been found in the step E3 (Yes of the step E7), the switch 2 forwards the packet in accordance with the contents of the processing part of the entry thus found (step E6).

On receipt of the response (step E7), the synchronization control section 44 of the client terminal 4 references the request ID to confirm if the number of responses that returned the requests ID has reached the number of the replications (step E8). In case the number of the responses returned has reached the number of the replications (Yes of the step E8), the synchronization control section 44 returns the response to the request section 41 (step E9). The request section 41 performs processing consistent with the response (step E10). If conversely the number of the responses returned is not up to the number of replications (No of the step E8), the synchronization control section 44 performs no processing.

An operation at the time of a readout request will now be explained. It is assumed here that a request to read out data corresponding to key1 is to be forwarded to an appropriate one of 12 servers 1, where the request is to be processed.

Initially, the processing of sending out a request from the client terminal 4 to the server 1 will be explained. An operation of sending a readout request is the same as the operation of sending the request according to the first exemplary embodiment shown in FIG. 4.

However, in the step A3, the controller 3 sets the packet's forwarding destination address based on the above mentioned hash value as found in the step A2 and on the request species (=0), while setting the client terminal's correct address as the source address.

Also, in the step A9, the forwarding destination server selection section 33 selects the forwarding destination server based on the destination address of the received packet and on the server table 31. This will now be detailed with reference to FIG. 10. For instance, if the upper three bits and the lower most bit of the hashed value are respectively '100' and '0,' the forwarding destination server selection section selects the server S6, from among the category IDs 2, as the forwarding destination server. If the upper three bits and the lower most bit of the hashed value are respectively '101' and '0,' the forwarding destination server selection section selects the server S7 as the forwarding destination server. In this manner, readout requests to the same category ID may be selected such as to assure load balancing because data must have been replicated within the same ID category.

The operation other than that described above is similar to the response sending operation of the first exemplary embodiment of the present invention and hence the corresponding explanation is dispensed with.

The operation of sending the response to the readout request from the server 1 to the client terminal 4 is the same as the operation of sending the response in the first exemplary embodiment of the present invention and hence the corresponding explanation is dispensed with.

In the above described second exemplary embodiment of the present invention, in doing data replication, data is sent out not by multi-cast from the client terminal 4 but rather by multicast from the switch 2 to the server. It is thus possible to suppress the total amount of the packets flowing in the entire network so that flooding is less liable to be produced.

In addition, in the second exemplary embodiment of the present invention, in which the load by the readout request is distributed among the servers having stored the same replications, it is possible to suppress the load otherwise imposed on the servers.

Third Exemplary Embodiment

Figure 12:
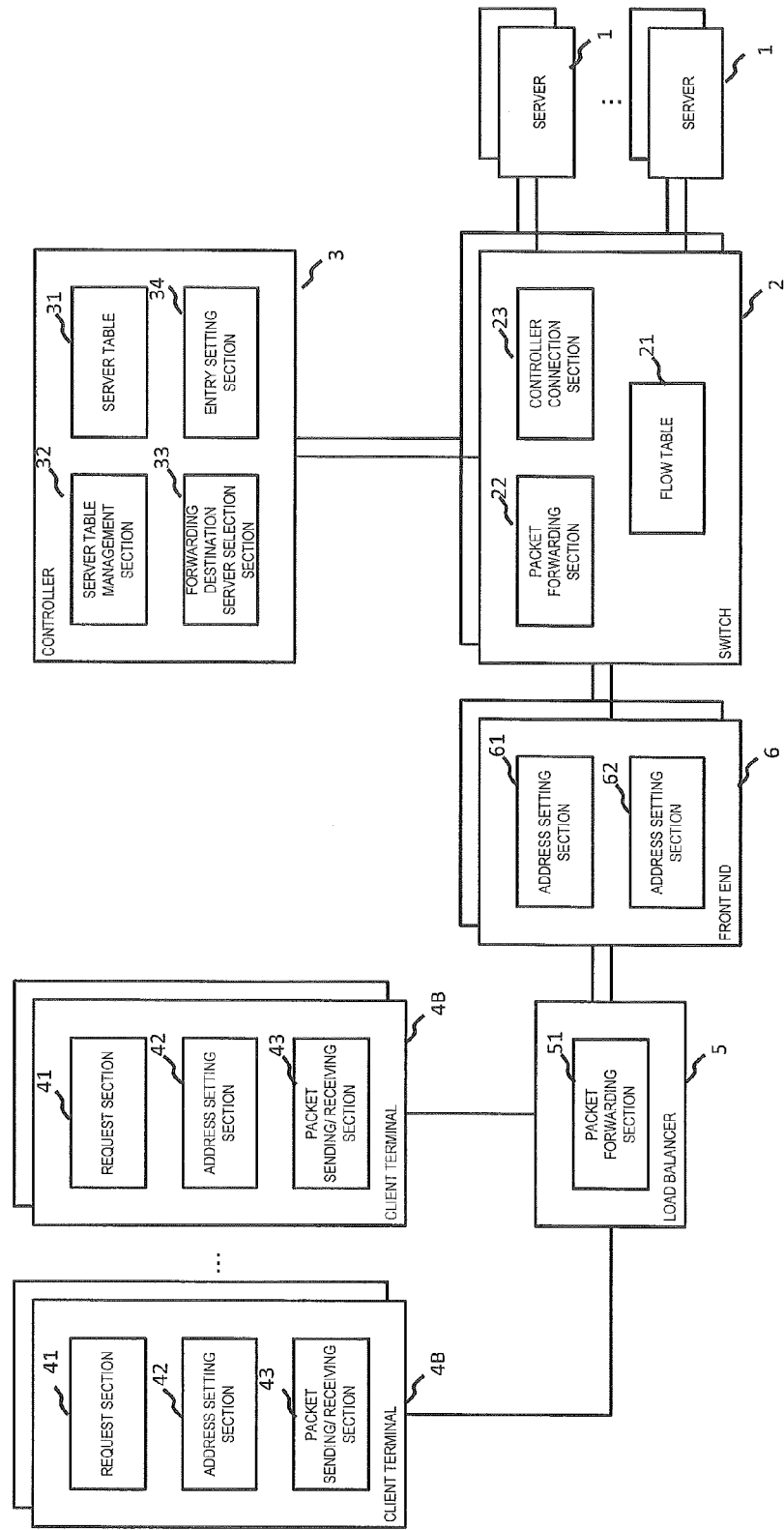
FIG. 12 is a block diagram showing a configuration of a distributed storage system according to a third exemplary embodiment of the present invention.

A third exemplary embodiment of the present invention, in which a relay node (front end 6) is arranged between the client terminal 4 and the switch 2, and the dummy address is generated in this relay node, will now be detailed with reference to the drawings. FIG. 12 depicts a block diagram showing a configuration of a distributed storage system of the third exemplary embodiment of the present invention.

Referring to FIG. 12, there is shown an arrangement including, in addition to a server 1, a switch 2, a controller 3 and a client terminal 4B, shown in the first exemplary embodiment, a load balancer 5 and a front end(s) 6.

The load balancer 5 is a load distribution apparatus provided with a packet forwarding section 51. The packet forwarding section 51 forwards the request, received from the client terminal 4B, to one of the front ends 6 connected thereto. In forwarding the packet, the packet's destination address is changed to the address of the front end 6 of the forwarding destination. The packet forwarding section 51 also forwards the response, received from the front end 6, to the client terminal 4B.

The front end 6 is the apparatus performing pre-processing for the request processing and includes an address setting section 61 and a packet sending/receiving section 62.

The address setting section 61 sets a destination address of the request received from the load balancer 5. As the destination address, a dummy address consistent with the key information contained in the request as well as the request species is set. Here, it is assumed that a hashed value of a preset number of bits, such as 32 bits, is calculated from the key contained in the request, and the hashed value is to be the dummy address. The source address remains to be same as the address of the client terminal 4B inherently set in the packet.

The packet sending/receiving section 62 receives the request from the load balancer 5 and sends out the request processed by the address setting section 61 to the switch 2, while sending the response received from the switch 2 to the load balancer 5.

The address setting section 42 of the client terminal 4B sets the address of the load balancer 5 as the destination address, while setting the correct address of the client terminal 4B as the source address.

The present exemplary embodiment is otherwise the same in configuration as the first exemplary embodiment of the present invention, and hence the corresponding explanation is dispensed with.

An operation of the present exemplary embodiment will now be detailed with reference to the drawings. In the explanation to follow, it is assumed that a write request for data (key1, value1) from the client terminal 4 is sent to an appropriate one 1 of four servers 1, where the request is processed. It is also assumed that the four servers 1 have already been detected by the controller 3 and that a server table shown in FIG. 3 has already been formulated by the server table management section 32.

Figure 13:
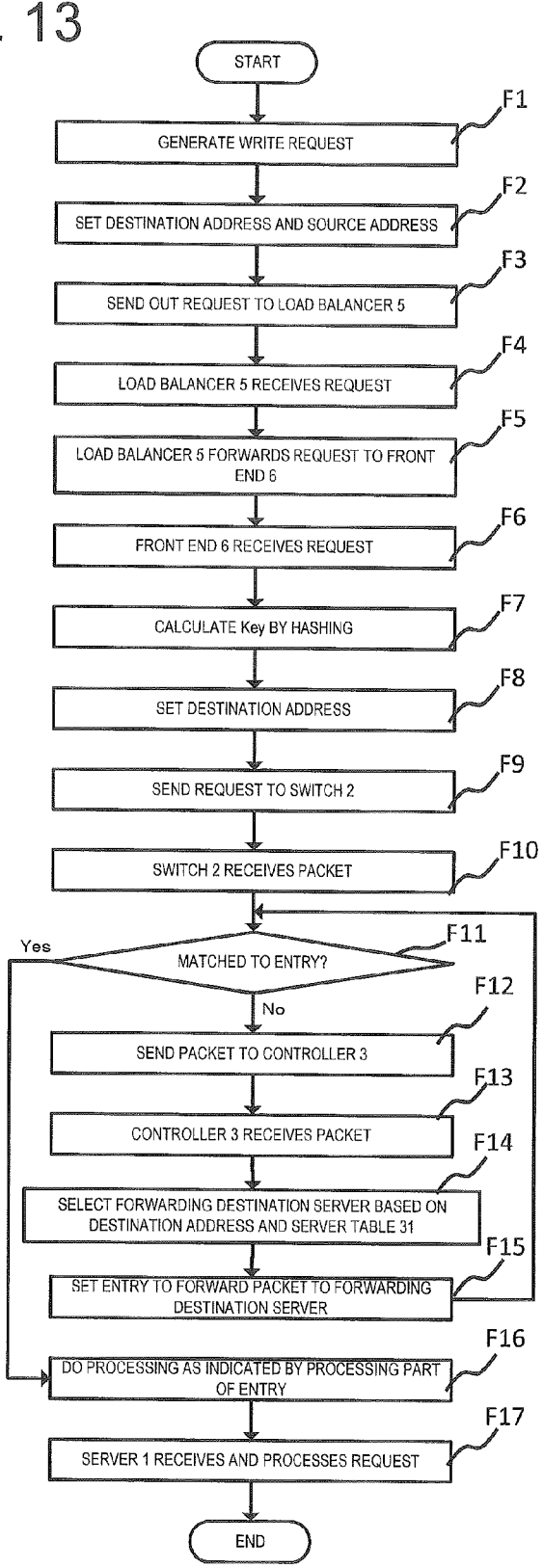
FIG. 13 is a flowchart for illustrating an operation (at the time of a write request) of the third exemplary embodiment of the present invention.

Initially, an operation of sending a write request from the client terminal 4 to the server 1 is explained. FIG. 13 depicts a flow table for illustrating an operation at the time of a write request according to the third exemplary embodiment of the present invention.

Referring to FIG. 13, initially the request section 41 of the client terminal 4 generates a write request for (key1, value1) in a step F1. The address setting section 42 then sets an address of the load balancer 5, as a packet's destination address, while setting the client terminal's correct address as a source address (step F2). The packet sending/receiving section 43 then sends out a request to the load balancer 5 (step F3).

On receipt of the request (step F4), the load balancer 5 forwards the request to one of the front ends 6 connected thereto (step F5).

When the front end 6 has received the request (step F6), the address setting section 61 calculates a hashed value of a preset number of bits, such as 32 bits, from key1 contained in the request (step F7). It is assumed here that the upper two bits of the hashed value are '10'. The front end sets the above mentioned hashed value as the packet's destination address, while setting, as the source address, the correct address of the client terminal 4 as inherently set in the packet (step F8). The front end 6 sends out the request to the switch 2 (step F9).

When the switch 2 has received the packet (step F10), the packet forwarding section 22 references the flow table 21 to check to see if there is the entry that matches the packet received (step F11). If no such entry has been found (No of the step F11), the controller connection section 23 sends out the packet to the controller 3 (step F12).

When the controller 3 has received the packet (step F13), the forwarding destination server selection section 33 selects the forwarding destination server based on the destination address of the received packet and on the server table 31. Here, the upper bits of the packet's destination address are mapped against the category IDs of the server table 31 to select the forwarding destination server in keeping with the upper bits of the destination address (step F14). Since the upper two bits of the hashed value are '10' (=2), the forwarding destination server selection section 33 selects the server S2, registered in the category ID2, as the forwarding destination server.

The entry setting section 34 generates an entry so that the packet will be forwarded to the forwarding destination server as selected by the forwarding destination server selection section 33, and sets the resulting entry in the switch 2 (step F15). If the server S2, for example, has been selected, the entry setting section generates such entry the conditional part of which is "destination address: upper two bits being '10'" and the processed part of which is "forwarding destination switch port number: P2", representing the switch port number the server S2 is connected to, and sets the resulting entry in the switch 2.

The packet forwarding section 22 then again checks to see if there is an entry that matches the packet (step F11). Since the entry has now been set in the step F15, the matched entry is found this time.

If the matched entry has been found in the step F11 (Yes in the step F11), the switch 2 forwards the packet in accordance with the contents of the processing part of the entry thus found (step F16). For instance, if the above mentioned entry has been set in the step F15 and the packet matched the entry, the packet is forwarded from the port number P2 to the server S2.

On receipt of the request, the server 1 performs processing in keeping with the request (step F17).

If thenceforth the switch 2 has received the packet corresponding to the "source address: upper two bits being '10,'" the switch sends out the packet from its port P2, without regard to the address of the source client terminal 4, without inquiring the controller 3 about the packet.

An operation of sending out a response from the server 1 that has received the request packet to the client terminal 4 will now be explained. FIG. 14 depicts a flowchart for illustrating an operation of the third exemplary embodiment of the present invention at the time of responding from the server.

Referring to FIG. 14, initially the server 1 sends out a response to the request (step G1 of FIG. 14).

When the switch 2 has received the packet (Step G2), the packet forwarding section 22 references the flow table 21 to check to see if there is an entry that matches the received packet (step G3). If no such entry is found (No of the step G3), the controller connection section 23 sends out the packet to the controller 3 (step G4).

The entry setting section 34 in the controller 3 generates an entry of the flow table 21 so that the packet will be forwarded to the client terminal 4, and sets the resulting entry in the switch 2 (step G5).

The packet forwarding section 22 of the switch 2 then again checks to see if there is an entry that matches the packet (step G3).

If the matched entry is found in the step G3 (Yes of the step G3), the switch 2 forwards the packet in accordance with the contents of the processing part of the entry thus found (step G6).

On receipt of the response, the front end 6 forwards it to the load balancer 5 (step G7). On receipt of the response, the load balancer forwards the response to the client terminal 4 (step G8).

On receipt of the response, the client terminal 4 performs the processing in keeping with the response (G9).

In the third exemplary embodiment of the present invention, described above, the dummy address for the destination address is formed by the front end 6, disposed closer than the load balancer 5 to the server 1. Hence, the client terminal 4 may be connected, at a location ahead of the load balancer 5, to a switch of the type which is not controlled by the controller 3.

It should be noted that, while preferred exemplary embodiments of the present invention are described above, the present invention is not to be restricted to these particular modes, such that further changes, substitutions or adjustments may be made within the range not departing from the basic technical concept of the invention. For instance, in the above described exemplary embodiments, it has been indicated that the address to be collated against the rule part of the flow entry is to be formed using hashing calculations. It is however also possible to use a method for forming a flow identifier or otherwise from the key by other techniques than those shown above.

Moreover, in the above described exemplary embodiments, it has been indicated that the address setting section is provided at the client terminal 4 or at the front end 6 and the hash value is generated at the client terminal 4 or at the front end 6. Alternatively, the key information may be sent through without the client terminal 4 or the front end 6 generating the hashed value. In such case, it may be the controller 3 that generates the hashed value from the key information or generates a flow identifier that can be uniquely found from the key information. Similar control may be implemented by the controller 3 causing the switch 2 on the path to perform the processing of embedding the hashed value or the flow identifier in a header part of the relevant packet or otherwise, or the processing of appending another header.

The above mentioned flow identifier may be of a variety of different configurations. For instance, the key may be rendered into numerical figures in accordance with the ASCII code and these numerical figures may then be put to modulo calculations, for example, calculated modulo $2^{32}$, to find a remainder, which may then be used as an address of the destination.

The entire disclosures of the above Patent Literatures and Non-Patent Literatures are incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

1 server
2 switch
2A packet forwarding apparatus
3 controller
3A control apparatus
4, 4A, 4B client terminal
5 load balancer
6 front end
21 flow table
22, 51 packet forwarding section
23 controller connection section
31 server table
32 server table management section
33 forwarding destination server selection section
33A forwarding destination selection section
34 entry setting section
34A entry setting section
41 request section
42, 61 address setting section
43, 62 packet sending/receiving section
44 synchronization control section

The invention claimed is:

1. A distributed storage system, comprising:
 a plurality of servers that store data that is uniquely associated with key information;
 a packet forwarding apparatus(es); and
 a control apparatus that controls the packet forwarding apparatus(es),
 wherein the packet forwarding apparatus(es), on receipt of a new packet that contains the key information and is addressed to one of the plurality of servers, requests the control apparatus to decide a forwarding destination from among the plurality of servers, and
 wherein the control apparatus comprises:
  a forwarding destination selection section that decides a forwarding destination of the packet based on key information in the packet; and
  an entry setting section that sets, in a packet forwarding apparatus(es) on a path to the forwarding destination, a flow entry for forwarding a subsequent packet(s) with same key information to the forwarding destination, and
 wherein the packet forwarding apparatus(es) forwards a packet(s) with the same key information to the forwarding destination using the set flow entry,
 wherein a destination address is set in the packet, the destination address being generated using a hash value of the key information,
 wherein a preset bit(s) of the hash value is used as a match condition in the flow entry,
 wherein the packet forwarding apparatus(es) is connected to a client terminal which generates a write request including a key, and
 wherein the client terminal:
  calculates a hash value of a preset number of bits by inputting the key as a letter string into a preset hash function;
  sets the hash value as the destination address of the request packet; and
  sets an address of the client terminal as a source address of the request packet.

2. The distributed storage system according to claim 1, wherein
 the forwarding destination selection section generates the hash value from the key information and decides a forwarding destination of the packet using a preset bit(s) of the generated hash value.

3. The distributed storage system according to claim 1, wherein
 in case the packet comprises a write request, the forwarding destination selection section selects a preset number of forwarding destination(s), and
 a number of replication(s) equal to the preset number is generated.

4. The distributed storage system according to claim 3, wherein the client terminal comprises a synchronization controller that checks whether or not generation of the preset number of replication(s) is completed.

5. The distributed storage system according to claim 1, comprising:
 a relay node provided between a source of the packet and the packet forwarding apparatus, wherein
 the relay node transforms the packet received from the source thereof into a packet that is addressed to the server and has a destination address generated using the hash value of the key information.

6. The distributed storage system according to claim 1, wherein the packet forwarding apparatus comprises a switch connected between the plurality of servers and the control apparatus, the switch comprising:
a flow table comprising a plurality of entries including packet forwarding rules; and
a packet forwarding section which searches, from the flow table, an entry having a match condition matching the packet.

7. The distributed storage system according to claim 6, wherein the switch further comprises:
a controller connection section which, if the packet matches none of the plurality of entries, forwards the packet to the control apparatus.

8. The distributed storage system according to claim 6, wherein an entry of the plurality of entries comprises a rule part that stores match conditions, and a processing part that stores processing contents applied to a packet that matches the match conditions, and the packet forwarding section collates a header part of the packet against a rule part of each entry in the plurality of entries and, in case of a match, executes the processing contents stored in the processing part.

9. The distributed storage system according to claim 1, wherein the control apparatus further comprises:
a server table which identifies a correspondence between a plurality of categories and the servers in charge of the categories; and
a server table management section which manages the server table and supervises the correspondence between the plurality of categories and the servers in charge of the categories.

10. The distributed storage system according to claim 1, wherein the client terminal requests a server of the plurality of servers using a request packet, the client terminal comprising:
a request section which generates the request packet; and
an address setting section which sets a destination address for the request packet using the hash value of key information.

11. The distributed storage system according to claim 10, wherein the client terminal further comprises:
a packet sending/receiving section which sends out the request packet from the request section to the packet forwarding apparatus, and notifies the request section about a response packet received from the packet forwarding apparatus.

12. A control apparatus connected to a plurality of servers and a packet forwarding apparatus, the plurality of servers storing data that is uniquely associated with key information, the packet forwarding apparatus requesting the control apparatus to decide a forwarding destination from among the plurality of servers on receipt of a new packet that contains the key information and is addressed to one of the plurality of servers, the control apparatus comprising:
a forwarding destination selection section that decides a forwarding destination of the packet based on key information in the packet; and
an entry setting section that sets, in a packet forwarding apparatus(es) on a path to the forwarding destination, a flow entry for forwarding a subsequent packet(s) with same key information to the forwarding destination,
wherein a destination address is set in the packet, the destination address being generated using a hash value of the key information,
wherein a preset bit(s) of the hash value is used as a match condition in the flow entry,
wherein the packet forwarding apparatus(es) is connected to a client terminal which generates a write request including a key, and
wherein the client terminal:
calculates a hash value of a preset number of bits by inputting the key as a letter string into a preset hash function;
sets the hash value as the destination address of the request packet; and
sets an address of the client terminal as a source address of the request packet.

13. A client terminal, comprising:
a request section that generates a request packet and a write request including a key; and
an address setting section that sets a destination address for the request packet using a hash value of key information, wherein
the client terminal requests a server using the request packet, and
the server stores data that is uniquely associated with the key information, and
wherein the address setting section:
calculates a hash value of a preset number of bits by inputting the key as a letter string into a preset hash function;
sets the hash value as the destination address of the request packet; and
sets an address of the client terminal as a source address of the request packet.

14. A distributed storage system, comprising:
a plurality of servers that store data that is uniquely associated with key information;
a packet forwarding apparatus(es); and
a control apparatus that controls the packet forwarding apparatus(es),
wherein the packet forwarding apparatus(es), on receipt of a new packet that contains the key information and is addressed to one of the plurality of servers, requests the control apparatus to decide a forwarding destination from among the plurality of servers, and
wherein the control apparatus comprises:
a forwarding destination selection section that decides a forwarding destination of the packet based on key information in the packet; and
an entry setting section that sets, in a packet forwarding apparatus(es) on a path to the forwarding destination, a flow entry for forwarding a subsequent packet(s) with same key information to the forwarding destination, and
wherein the packet forwarding apparatus(es) forwards a packet(s) with the same key information to the forwarding destination using the set flow entry,
wherein the packet forwarding apparatus is connected to a client terminal which requests a server of the plurality of servers using a request packet, the client terminal comprising:
a request section which generates the request packet; and
an address setting section which sets a destination address for the request packet using a hash value of key information,
wherein the request section generates a write request including a key, and wherein the address setting section:
    calculates a hash value of a preset number of bits by inputting the key as a letter string into a preset hash function;
    sets the hash value as the destination address of the request packet; and
    sets an address of the client terminal as a source address of the request packet.

* * * * *